(12) United States Patent
Nakayama

(10) Patent No.: US 8,920,900 B2
(45) Date of Patent: Dec. 30, 2014

(54) HEAT ACTIVATED EXPANSION FOAM WITH LIP SEAL

(75) Inventor: David T. Nakayama, Canton, MI (US)

(73) Assignee: Toyota Jidosha Engineering & Manufacturing North America, Inc., Erlanger, KY (US)

( * ) Notice: Subject to any disclaimer, the term of this patent is extended or adjusted under 35 U.S.C. 154(b) by 236 days.

(21) Appl. No.: 13/588,498

(22) Filed: Aug. 17, 2012

(65) Prior Publication Data

US 2014/0050880 A1    Feb. 20, 2014

(51) Int. Cl.
*B32B 3/06* (2006.01)

(52) U.S. Cl.
USPC .................................. 428/99; 296/187.02

(58) Field of Classification Search
CPC .... B32B 3/06; B60R 13/0815; B62D 29/002; B29C 44/18
USPC ........................ 428/99; 296/187.02
See application file for complete search history.

(56) References Cited

U.S. PATENT DOCUMENTS

| 7,370,865 B2 | 5/2008 | Vik et al. |
| 8,087,916 B2 | 1/2012 | Kanie et al. |

*Primary Examiner* — Alexander Thomas
(74) *Attorney, Agent, or Firm* — Gifford, Krass, Sprinkle, Anderson & Citkowski, P.C.

(57) ABSTRACT

A cavity filler for use in a hollow pillar of a vehicle. The cavity filler includes a carrier having a generally planar upper surface, an expandable foam mounted to the carrier wherein the expandable foam is mounted to the carrier around a peripheral edge of the carrier. The invention further includes a flange connected to the expandable foam (also made of the expandable foam) wherein the flange extends away from and generally parallel with the planar upper surface of the carrier. The extension and flange of the expandable foam are operable to extend the expandable foam to ensure a full filling of the expandable foam after the heat treating process. The fully occupied hollow cavity of the pillar with the expandable foam blocks the transmission of noise from the engine, wind and/or road noise through the pillars to the interior vehicle cabin.

8 Claims, 3 Drawing Sheets

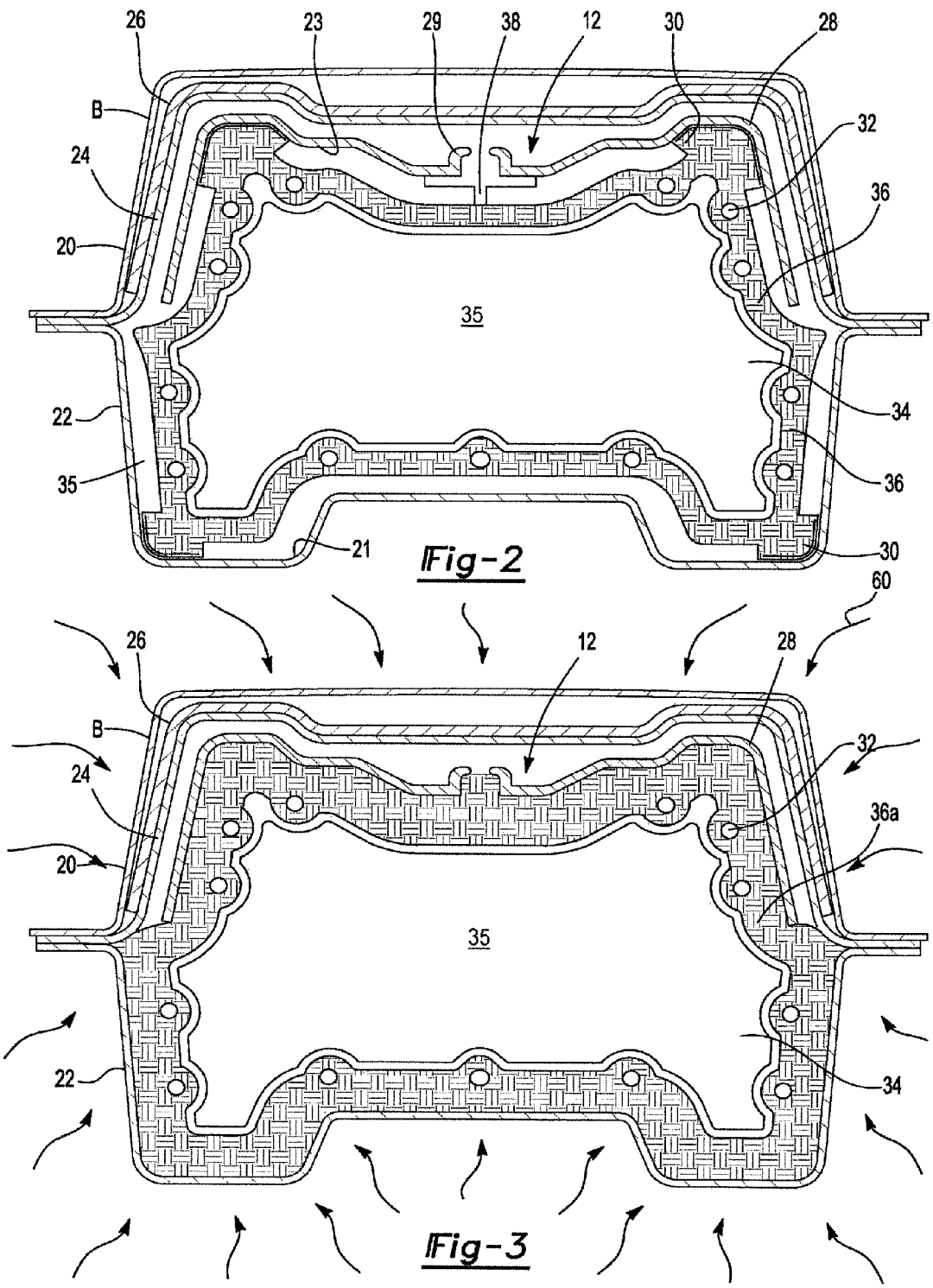

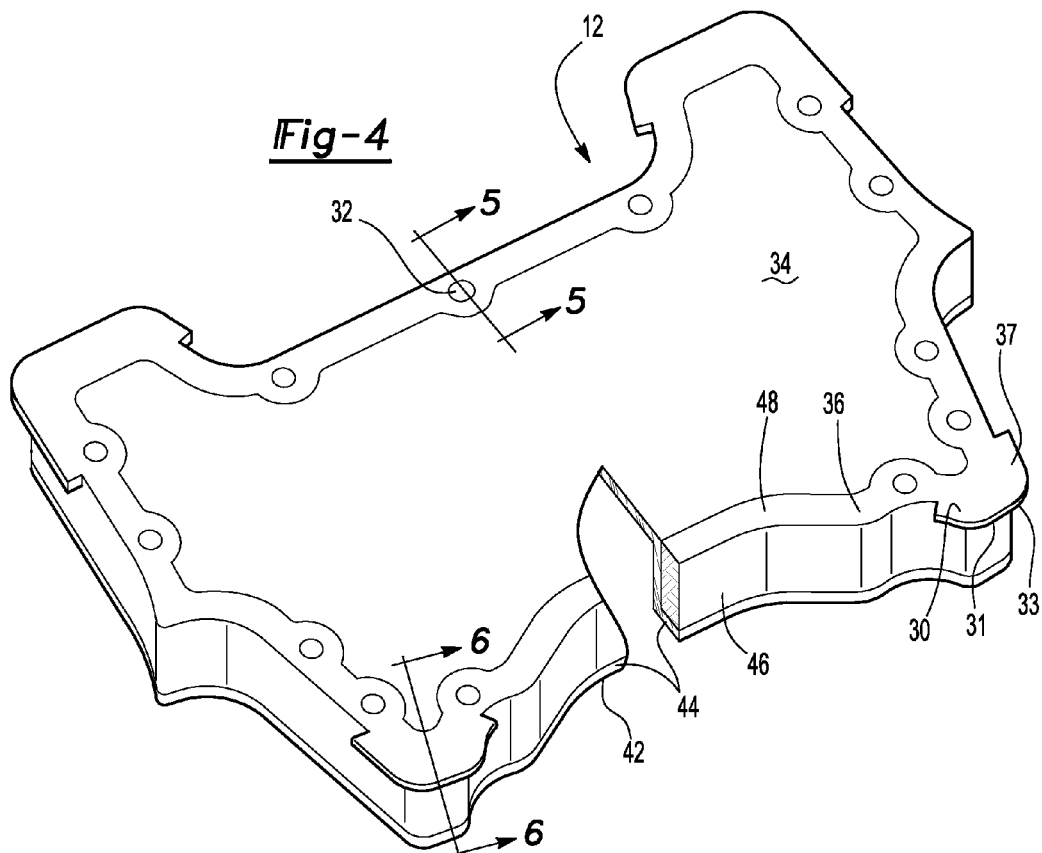
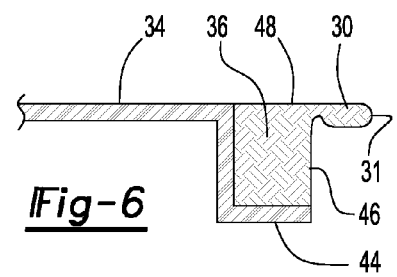
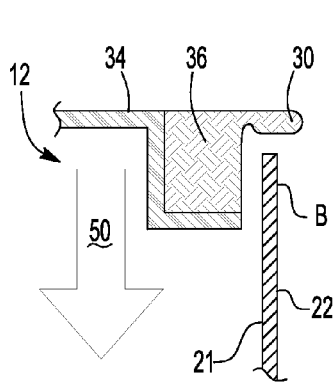
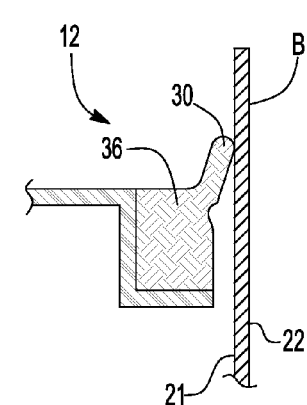
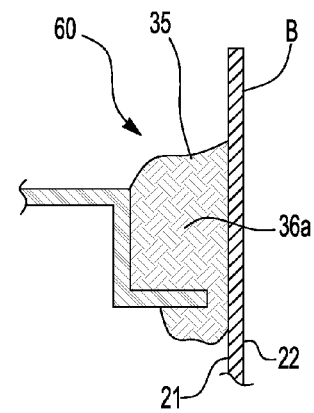

HEAT ACTIVATED EXPANSION FOAM WITH LIP SEAL

FIELD OF THE INVENTION

The present invention relates to a carrier operable to hold an expandable foam having an extended flange wherein the foam is operable to expand and fill a cavity.

BACKGROUND OF THE INVENTION

It is well known in the art to provide an expandable foam within a pillar of an automobile. The expandable foam is typically placed on a carrier or other jig-like mechanism. The expandable foam is used to fill a space operable to block noise, either from the road, wind or engine, from reaching the vehicle cabin. These carriers with the expandable foam are placed at positions within the A, B, C and/or D pillars. The foam on the carrier expands to fill the cavity within the pillars. Heat is applied to the vehicle body during various other heat treating processes thereby expanding the foam to fill the cavity of the pillar. However, the expandable foam frequently does not reach all areas and corners of the hollow cavity of the pillars. Accordingly, there exists a need in the art to provide a carrier having expandable foam operable to fully fill the hollow cavity of a vehicle pillar.

SUMMARY OF THE INVENTION

The present invention provides for a cavity filler for use in a hollow pillar of a vehicle. The cavity filler includes a carrier having a generally planar upper surface, an expandable foam mounted to the carrier wherein the expandable foam is mounted to the carrier around a peripheral edge of the carrier. The invention further includes a flange connected to the expandable foam (also made of the expandable foam) wherein the flange extends away from and generally parallel with the planar upper surface of the carrier. The flange is operable to flex and bend on the side walls of the cavity of a hollow pillar. The extension and flange of the expandable foam are operable to extend the expandable foam to ensure a full filling of the expandable foam after the heat treating process. The fully occupied hollow cavity of the pillar with the expandable foam blocks the transmission of noise from the engine, wind and/or road noise through the pillars to the interior vehicle cabin.

BRIEF DESCRIPTION OF THE DRAWINGS

FIG. 2 illustrates a cross-sectional view of the pillar and carrier having the expandable foam and flange;

FIG. 3 illustrates a cross-sectional view of the pillar and expandable foam wherein the expandable foam is expanded to fill the hollow cavity of the pillar;

FIG. 4 illustrates a cross-sectional and perspective view of the carrier having the expandable foam and extended flange;

FIG. 5 illustrates a cross-sectional view along the line 5-5 of FIG. 4 of the carrier and expandable foam before expansion;

FIG. 6 illustrates a cross-sectional view along the line 6-6 of FIG. 4 of the expandable foam and flange before expansion;

FIG. 7 illustrates a cross-sectional view of the expandable foam and extended flange illustrating the movement of the carrier and extended flange adjacent to the pillar 22;

FIG. 8 illustrates a cross-sectional view of the expandable foam and flange wherein the flange is flexed along a portion of the pillar; and FIG. 9 illustrates a cross-sectional view of the carrier and expandable foam when the expandable foam is in an expanded position.

DETAILED DESCRIPTION OF THE INVENTION

Figure 1:
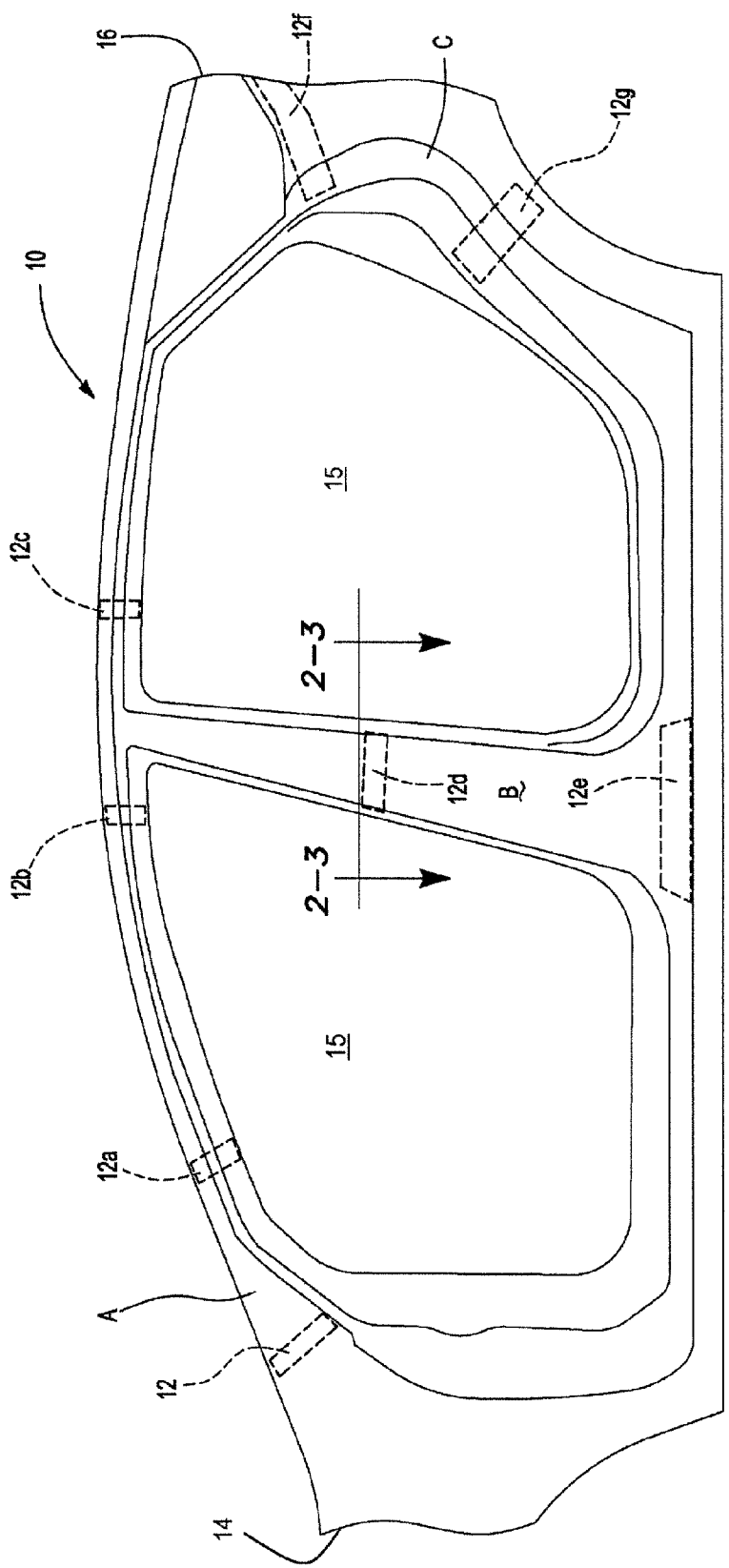
FIG. 1 illustrates a schematic view of various positioning of the carrier having expandable foam and extended flange.

The present invention relates to an apparatus operable to fully fill a hollow pillar cavity of a vehicle.

FIG. 1 illustrates a side view of a vehicle showing pillars A, B, and C of the vehicle. It is common and well known for a vehicle to have the A, B, C and/or D pillars to support the body of the vehicle. It is further known to provide for a roof, rocker or an other area having an open or hollow space allowing for the transmission of noise from the road, wind, or engine. The carrier of the present invention is suitable for any cavity or hollow space requiring the blockage of noise. The vehicle 10 includes a plurality of carriers 12 and 12a-12g. The vehicle includes a front end 14 and a rear end 16 wherein the A pillar is positioned closest to the front end 14 and the C pillar is positioned closest to the rear end 16. The carriers 12 and 12a-12g are positioned at various points within the pillars to prevent the transmission of noise into the vehicle cabin 15. By way of example, the A pillar which is closest to the front end 14 of the vehicle 10 is close to the engine. The engine naturally creates a significant amount of noise which can be transmitted into the vehicle cabin 15. The inclusion of the carriers with the expandable foam material 12, 12a, 12b positioned within the A pillar significantly blocks the transmission of noise from the engine at the front end of the vehicle 14 into the vehicle cabin 15. Similarly, the carriers 12d, 12e within the B pillar prevent the transmission of noise, specifically road noise, into the vehicle cabin 15. Further, carriers 12c, 12f, 12g located within the C pillar prevent the transmission of noise, either road noise or otherwise, into the vehicle cabin 15.

FIGS. 2 and 3 illustrate a cross-sectional view of the B pillar and carrier 12 along the line 2-3 as shown in FIG. 1. FIG. 2 illustrates the expandable foam on the carrier before heat expansion of the expandable foam occurs. The carrier 12 is mounted within the B pillar. The B pillar is made of a shell-like construction having a first portion 20 and a second portion 22. The first portion 20 and the second portion 22 are molded or stamped together to form the B pillar. Further structural supports within the B pillar include the supports 24, 26. The support 28 of the B pillar includes structural support 29 for accepting a clip portion 38 of the carrier 12. The structural support of the B pillar is made typically of a metal or metal-like material, or a plastic or plastic-like material such as aluminum, steel, polymers, or other strong materials. The carrier 12 is positioned within the B pillar before the B pillar is fully constructed (i.e. during the time before the first portion 20 and the second portion 22 are stamped together).

The carrier 12 is generally planar having an upper surface 34 and a lower surface 42. The main base of the carrier 12 is made of a plastic or plastic-like, or polymer or polymer-like material which is adapted not to expand under high heat conditions. The base of the carrier 12 includes a plurality of pins 32 operable to secure an expandable foam 36. The pins 32 are made of the same material as the base of the carrier 12. The expandable foam 36 surrounds a peripheral edge of the carrier 12. The expandable foam is flush with the upper surface 34 of the carrier 12. The expandable foam 36 rests on a ledge 44 of the carrier 12. The ledge 44 is an extension of the lower surface 42 of the carrier 12. The expandable foam 36 may be different colors or textures as compared to the material making up the base of the carrier or the upper surface 34 of the carrier to distinguish the expandable foam 36 from the carrier base or upper surface 34.

The expandable foam 36 includes a plurality of extended flanges 30 extending away from the carrier at the generally four corners of the expandable foam 36 of the carrier 12. The extended flanges 30 are molded out of the expandable foam 36 and are a one piece construction with the expandable foam 36. The extended flange 30 extends at a distance of between 1 millimeter and 15 millimeters away from the carrier 12. The flange may include a generally rounded free end 31. The flange 30 ranges in thickness from 0.5 millimeter to 10 millimeters in thickness depending on the amount of expandable foam required to fill the cavity 35 of the B pillar.

As the vehicle body undergoes heat treatment of between 150-400° Fahrenheit, the heat 60 warms the expandable foam 36 to an exploded end state 36a as shown in FIG. 3. This expansion typically occurs at 320° Fahrenheit. The heat 60 is operable to expand the foam 36 and the expandable foam of the flange 30 to fully fill the area/cavity 35 of the B pillar. The extended flange 30 extends the expandable foam to areas to which the expandable foam would not ordinarily reach. Further, the flange 30 acts as a support structure against the inner wall 21, 23 of the B pillar to further support the carrier 12 before the foam 36 is in the exploded end state 36a. FIG. 4 illustrates a perspective and cross-sectional view of the carrier 12. The carrier 12 includes an upper surface 34 and a lower surface 42. The carrier further includes a ledge 44 wherein the expandable foam 36 rests upon. The upper surface 34 of the carrier 12 is generally planar. The expandable foam 36 includes an upper surface 48 and a side wall 46. The upper surface 48 is parallel to and rests flush with the upper surface 34 of the carrier 12. The side wall 46 is generally perpendicular to the upper surface 48 of the expandable foam 36.

The flange 30 further includes an upper surface 37, a side wall 31, and a lower surface 33. The upper surface 37 is flush with and undisturbed from the upper surface 48 of the expandable foam 36 and also flush with the upper surface 34 of the carrier 12. The side wall 33 of the flange 30 is generally perpendicular to the upper surface 37 of the flange 30 and generally perpendicular to the lower surface 33 of the flange 30.

FIG. 5 illustrates a cross-sectional view along the line 5-5 as shown in FIG. 4. The pin 32 of the base of the carrier 12 is shown operable to support the expandable foam 36 resting on the ledge 44. The pin 32 is shown to be a one-piece construction with the carrier 12 and portions of the carrier 12 including the upper surface 34 of the carrier 12.

FIG. 6 illustrates a cross-sectional view along the line 6-6 as shown in FIG. 4. The flange 30 is shown having a generally rounded free end 31. The flange 30 extends away from the expandable foam 36 generally parallel with the upper surface 34 of the carrier and generally parallel with the upper surface 48 of the expandable foam 36. The flange 30 is generally perpendicular to the side wall 46 of the expandable foam 36. FIG. 6 further illustrates the expandable foam 36 resting on the ledge 44. FIGS. 6, 7 and 8 illustrate a small indentation located between the flange 30 and the side wall 46. The indentation is provided to increase the flexibility of the flange 30. As a secondary embodiment, no indentation is present between the flange 30 and the side wall 46 of the expandable foam 36.

FIG. 7 illustrates a movement in cross-sectional view of the flange 30 moving 50 to come into contact with the inner surface 21 of the second portion 22 of the B pillar. Movement 50 of the carrier 12 and the flange 30 comprised of the expandable foam 36 will allow the flange 30 to come into contact with the inner surface 21 and allow the flange 30 to move, flex, and bend before expansion to further secure the carrier 12 within the cavity 35 of the B pillar.

FIG. 8 illustrates the flange 30 of the expandable foam 36 in contact with the inner surface 21 of the second portion 22 of the B pillar when the carrier 12 is in a resting position before heat exposure.

FIG. 9 illustrates a view of the carrier 12 having the expandable foam 36 in an exploded end state 36a. As heat 60 is applied to the expandable foam 36, the expandable foam 36 expands up to ten times its original volume to the exploded end state 36a. FIG. 9 illustrates the expandable foam 36 in the exploded end state 36a expanded and fully in contact with and fully filling the cavity 35 and in contact with the inner surface 21 of the second portion 22 of the B pillar.

The carrier of the present invention is injected molded together at the same time as the expandable foam is molded. Although made of two materials, it is molded as a one piece construction with the expandable foam material around the peripheral edge. Alternatively, the part is molded in a two step process where the expandable foam and the carrier are molded separately, and later assembled together as one piece. This method is utilized for various different expandable foams. The final assembly is put together whether by hand or machine.

A method is further provided to prevent or reduce the transmission of noise in a hollow cavity, such as a pillar. The method of reducing noise in a hollow cavity of a vehicle, the method comprising the steps of, creating a flange on a portion of expandable foam, connecting the expandable foam to the cavity of the vehicle, allowing the flange of the expandable foam to contact an inner wall of the hollow cavity and heating the expandable foam and flange to a predetermined temperature thereby allowing the expandable foam to fill the cavity thereby preventing the transmission of noise. The predetermined temperature ranges between 150-400° Fahrenheit. Allowing the flange to contact the inner surface of the hollow cavity further ensures stability of the expandable foam (before expansion) and ensures complete filling of the expandable foam within the hollow cavity.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A cavity filler for use in a hollow pillar of a vehicle, the cavity filler comprising:
   a carrier having a generally planar upper surface;
   an expandable foam connected to the carrier, the expandable foam connected to the carrier around a peripheral edge of the carrier; and
   a flange connected to the expandable foam, the flange made of the expandable foam, the flange extending away from and generally parallel with the planar upper surface of the carrier;
   whereas the expandable foam and the flange made of the expandable foam is operable to expand to occupy the cavity on the hollow pillar thereby preventing the transmission of noise.

2. The cavity filler of claim 1 wherein the carrier further includes a lower ledge.

3. The cavity filler of claim 2 wherein the expandable foam rests on the lower ledge.

4. The cavity filler of claim 1 wherein the expandable foam is made of a resilient material operable to be flexible at least before foam expansion.

5. The cavity filler of claim 1 wherein the cavity filler further includes a clip operable to connect to the inside of a pillar of a vehicle.

6. The cavity filler of claim 1 wherein the flange, in a resting position, creates a generally perpendicular angle with expandable foam.

7. The cavity filler of claim 6 wherein the flange is operable to flex.

8. The cavity filler of claim 6 wherein an indentation is provided between the flange and the expandable foam providing for further flexibility of the foam.

\* \* \* \* \*